US006436570B1

(12) United States Patent
Chalasani et al.

(10) Patent No.: US 6,436,570 B1
(45) Date of Patent: Aug. 20, 2002

(54) ELECTRICAL DISTRIBUTION SYSTEM FOR COMPOSITE BATTERY STAND AND COMPOSITE BATTERY STAND INCORPORATING THE SAME

(76) Inventors: Subhas Chandra Chalasani, 4417 Brigade Ct., Plano, TX (US) 75024; Keith Bruce Kelley, 9602 Old Nacogdoches Trail, Forney, TX (US) 75126; Roy Kuipers, 5418 Ranger Dr., Rockwall, TX (US) 75032

(*) Notice: Subject to any disclaimer, the term of this patent is extended or adjusted under 35 U.S.C. 154(b) by 0 days.

(21) Appl. No.: 09/568,020

(22) Filed: May 10, 2000

(51) Int. Cl.⁷ .............................. H01M 2/10; H01M 2/20
(52) U.S. Cl. ...................... 429/121; 429/123; 429/150; 429/159; 429/160
(58) Field of Search ................................ 206/703–705; 211/134, 135, 153, 182; 29/855, 856, 858; 429/121–123, 96, 97, 99, 100, 130, 148, 150, 159, 160

(56) References Cited

U.S. PATENT DOCUMENTS

| | | | | |
|---|---|---|---|---|
| 5,304,434 A | * | 4/1994 | Stone | |
| 5,366,827 A | * | 11/1994 | Belanger et al. | |
| 5,709,280 A | * | 1/1998 | Beckley et al. | |
| 5,890,606 A | * | 4/1999 | Kuipers | |

* cited by examiner

Primary Examiner—Patrick Ryan
Assistant Examiner—Susy Tsang-Foster

(57) ABSTRACT

For use with a composite battery stand having a shelf adapted to receive at least one battery, an electrical distribution system, a composite battery stand incorporating the system and a method of manufacturing the composite battery stand. In one embodiment, the system includes: (1) a rigid conductor, longitudinally formed in the shelf, that provides structural support to the shelf and (2) a connector coupled to the rigid conductor and adapted to receive a mating connector of a battery thereby providing electrical connectivity thereto.

25 Claims, 2 Drawing Sheets

ELECTRICAL DISTRIBUTION SYSTEM FOR COMPOSITE BATTERY STAND AND COMPOSITE BATTERY STAND INCORPORATING THE SAME

CROSS-REFERENCE TO RELATED APPLICATIONS

This application is related to U.S. patent application Ser. No. 09/568,107, entitled "COMPOSITE BATTERY STAND WITH INTEGRAL SPILL CONTAINMENT," to Chalasani, et al., filed on May 10, 2000. The above-listed application is commonly assigned with the present invention and is incorporated herein by reference as if reproduced herein in its entirety.

TECHNICAL FIELD OF THE INVENTION

The present invention is directed, in general, to battery stands and, more specifically, to an electrical distribution system for a composite battery stand, a composite battery stand incorporating the system and a method of manufacturing the composite battery stand.

BACKGROUND OF THE INVENTION

The traditional reliability of telecommunication systems that users have come to expect and rely upon is based, in part, on the reliance on redundant equipment and power supplies. Telecommunication switching systems, for example, route tens of thousands of calls per second. The failure of such systems, due to either equipment breakdown or loss of power, is unacceptable since it may result in a loss of millions of telephone calls and a corresponding loss of revenue.

Power plants, such as battery plants, address the power loss problem by providing the system with an energy reserve (e.g., a battery) in the event of the loss of primary power to the system. A battery plant generally operates as follows. The battery plant includes a number of batteries, rectifiers and other power distribution equipment. The primary power is produced by the rectifiers, which convert an AC main voltage into a DC voltage to power the load equipment and to charge the batteries. The primary power may, however, become unavailable due to an AC power outage or the failure of one or more of the rectifiers. In either case, the batteries then provide power to the load. Redundant rectifiers and batteries may be added to the battery plant as needed to increase the availability of the battery plant.

Space is normally a concern when constructing a battery plant. This is because it is common for a battery plant to be located on site, near the telecommunications system. The battery plant typically houses all of the batteries needed to provide power during a power outage. The tremendous amount of space necessary to accommodate the battery plants has prompted the design of battery stands capable of holding a number of batteries. Battery stands utilize the available space more efficiently by allowing the batteries to be vertically stacked.

Battery stands are typically constructed of steel members, which may be bolted or welded together to form a desired battery stand. Many different sizes and shapes of batteries may be employed in battery plants, including flooded round and rectangular cell batteries, valve regulated batteries and gel batteries. Because of the different sizes and shapes of the batteries, the battery stands must be capable of adapting to the different dimensional requirements of each battery. In response to the wide variety of batteries, an "erector set" type of structure was developed wherein each battery stand includes steel beam members that are bolted together to form a battery stand adapted to receive a particular type of battery.

Assembling a battery stand, whether at the factory or on site, generally requires a tremendous amount of time and effort. The time required to assemble a medium size battery stand may easily be two to three days. Equally frustrating problems may arise whether one orders a preassembled battery stand or one assembled on site. Preassembled battery stands require the end user to thoroughly determine all of the requirements of the battery stand, including any constraints particular to the building in which the stand will be placed. Furthermore, the preassembled battery stands are typically cumbersome to handle and, due to their great weight, may be extremely expensive to ship. Having the battery stands assembled on site is not without its own problems. Assembling the battery stand on site limits the end user to the parts available at the assembly site. With so many small brace members to assemble such a large structure, it is inevitable that some parts will be missing when needed to assemble a customized battery stand for a particular location.

The steel battery stand has many undesirable features. Because the battery stand includes steel brace members, it is common for the battery stand to weigh several hundred pounds. This creates a major problem both with shipping the stand to the site, which can become very expensive, and with moving the stand within the battery plant.

Batteries housed on the battery stand may explode or leak due to, among other things, age, excessive use, manufacturing defect or abuse. The electrolyte (e.g., acid) in the batteries may be extremely corrosive, causing the steel members of the battery stand to deteriorate. When the electrolyte is spilled on the steel surface of the battery stand, the surface must typically be replaced. Due to the extensive number of batteries that may leak and the extensive number of brace members that should be removed and replaced, maintenance of the battery stand can be a time consuming and expensive process.

Further, the steel battery stand is electrically conductive and may thus create a possibility of electrical shock to those who may come in contact with the battery stand. A requirement of the steel battery stand is that it should be painted prior to use. This is both an aesthetic requirement and a safety requirement. The battery stands may be accessed many times a day. The battery stands, therefore, should be painted to be aesthetically pleasing. Most steel battery stands, or at least the brace members of the stands, are painted prior to being shipped on site. During installation, however, the battery stand will likely be subjected to nicks and scratches such that additional touch-up painting is required. In addition to providing an aesthetically pleasing surface, the electrically insulative properties of the paint may protect those working in close proximity to the steel battery stand from electrical shock.

Today, battery suppliers and manufacturers design, build and install battery stands capable of housing many batteries. Having so many batteries packed within such a small space can create many problems. As discussed above, batteries routinely age, leak or fail all together. Working on such batteries may be extremely difficult, especially in the tight confines of the battery plant. When a problem is detected, a technician may completely remove the battery, run a diagnostic test on that battery and decide whether to replace it. This is a time-consuming task due to the way that the batteries are commonly connected together. Batteries in a battery plant are normally connected to each other, either in series or in parallel, using a nut and bolt connection (much like that used with a car battery). Whether the batteries are to be connected in series or in parallel may depend on the voltage of the individual batteries and the requirements of the load supplied by the battery plant. Connecting all of the batteries together using the traditional nut and bolt connection may be very time-consuming, a problem which is exacerbated by the tight working environment.

Accordingly, what is needed in the art is a battery stand and an electrical distribution system employable in a battery plant that rectifies the deficiencies of the prior art.

SUMMARY OF THE INVENTION

To address the above-described deficiencies of the prior art, the present invention provides, for use with a composite battery stand having a shelf adapted to receive at least one battery, an electrical distribution system, a composite battery stand incorporating the system and a method of manufacturing the composite battery stand. In one embodiment, the system includes: (1) a rigid conductor, longitudinally formed in the shelf, that provides structural support to the shelf and (2) a connector coupled to the rigid conductor and adapted to receive a mating connector of a battery thereby providing electrical connectivity thereto.

The present invention introduces, in one aspect, the broad concept of employing a rigid conductor to provide both electrical conductivity and structural support for a shelf of a composite battery stand. By employing the rigid conductor as a structural support for the shelf, the shelf may be made thinner while maintaining its ability to support the weight of the batteries. The battery stand may thus be able to accommodate a greater number of batteries than previously possible. Further, the batteries in the stand may need to be removed periodically for maintenance or replacement. The electrical distribution system of the present invention includes a connector, coupled to the rigid conductor, that enables the battery to be easily disconnected and removed from the stand.

In one embodiment of the present invention, the system includes a plurality of connectors coupled to the rigid conductor and adapted to receive a corresponding plurality of mating connectors of a respective plurality of batteries. In this embodiment, the rigid conductor electrically connects the plurality of batteries to form a battery string. Of course, the system may be adapted to form any number of batteries and battery strings.

In one embodiment of the present invention, the system further includes a switch coupled to the rigid conductor. The battery or battery string may thus be switched on or off from a central location on the battery stand.

In one embodiment of the present invention, the shelf includes a flame retardant composite material. In a preferred embodiment, the shelf may be formed from a material that meets or exceeds U.L. 94 V-0. Those skilled in the pertinent art are familiar with a variety of flame retardant materials.

In one embodiment of the present invention, the shelf includes a corrosion resistant composite material. In a preferred embodiment, the shelf is designed to receive a plurality of batteries subject to leaking electrolyte. The shelf is thus preferably resistant to the corrosive effects of the leaking electrolyte.

In one embodiment of the present invention, the shelf includes a recessed section therein to receive the battery. The battery may thus be secured within the recessed section to meet seismic requirements. Of course, other methods of securing the battery in the battery stand are well within the broad scope of the present invention.

In one embodiment of the present invention, the rigid conductor forms part of a bus bar of the battery stand. In a related embodiment, the rigid conductor includes copper. In a preferred embodiment, the rigid conductor form part of a copper bus bar. Those skilled in the pertinent art are aware of the advantageous conductive and structural properties of copper. Of course, other materials are well within the broad scope of the present invention.

In one embodiment of the present invention, the shelf is a bottom shelf of the battery stand. In this embodiment, the battery stand further includes a spacer and a second shelf that stacks on and interlocks with the bottom shelf. The stand may thus be shipped unassembled and assembled on site with less effort than is ordinarily required by other types of battery stands (e.g., steel battery stands). In a related embodiment, the system further includes an inter-shelf conductor coupled between the bottom and second shelves. The inter-shelf conductor may thus allow the batteries on the bottom and second shelves to be connected together to form one or more battery strings.

In one embodiment of the present invention, the battery is selected from the group consisting of (1) a valve regulated lead acid battery and (2) a gel type electrolyte battery. Of course, other types of batteries are well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
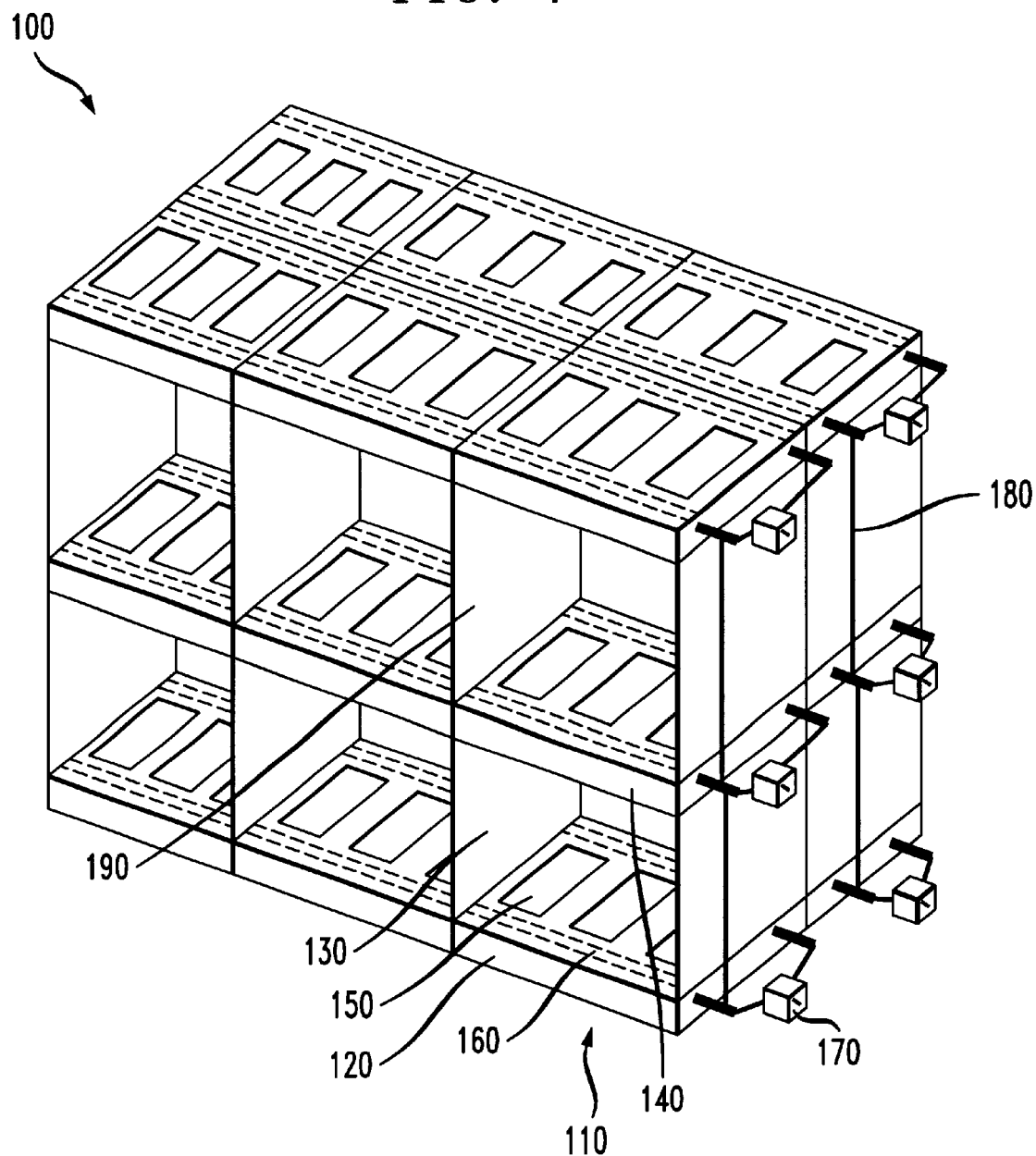
FIG. 1 illustrates an isometric view of an embodiment of a composite battery stand constructed in accordance with the principles of the present invention.

Referring initially to FIG. 1, illustrated is an isometric view of an embodiment of a composite battery stand 100 constructed in accordance with the principles of the present invention. The composite battery stand 100 includes a plurality of battery storage compartments 110, each adapted to receive a number of batteries. Although the illustrated composite battery stand 100 has twelve battery storage compartments 110, those skilled in the pertinent art realize that the composite battery stand 100 may include any number of battery storage compartments depending on the configuration desired. This allows for flexibility when assembling the composite battery stand 100, such that many batteries, possibly having different shapes and sizes, may be accommodated in a limited space.

The time required to assemble a typical steel battery stand of the prior art may easily be two to three days. The components of the composite battery stand 100, however, are advantageously designed to stack on and interlock with each other to minimize the amount of time required to assemble the composite battery stand 100. The illustrated composite battery stand 100, for example, may typically be assembled in only a few hours.

In the illustrated embodiment, the composite battery stand 100 is composed of a composite material, such as plastic, fiberglass, ceramic, sheet molding compound or structural foam of course, other composite materials may be employed as may be advantageous in a particular application.

The composite material may, in an advantageous embodiment, be a flame retardant material, such as a material that meets or exceeds U.L. 94 V-0. Those skilled in the pertinent art are familiar with a variety of flame retardant materials. The composite material may also be corrosion resistant. Using a composite material, rather than steel, provides some distinct advantages. Unlike a steel battery stand, wherein electrolyte leaking from the battery may corrode the steel and thus decrease the structural integrity of the battery stand, the composite material forming the composite battery stand 100 is generally not adversely affected by the electrolyte. Also, the composite material may be manufactured in many desirable colors, eliminating both the need to paint the composite battery stand 100 prior to assembly and the need to touch up the paint subsequent to installation.

The composite battery stand 100 may also have a lower production cost than an equivalent steel battery stand. Further, composite materials are typically less dense than steel. For this reason, the composite battery stand 100 will typically weigh much less than a comparable steel battery stand.

In the illustrated embodiment, the composite battery stand 100 includes an number of bottom shelves, one of which is designated 120. Each bottom shelf 120 acts as a base upon which a number of batteries may rest. The bottom shelf 120 has a number of recessed sections 150 therein to receive respective ones of the batteries. Of course, the recessed sections 150 are not required by the present invention. Alternatively, the bottom shelf 120 may employ a grid of receptacles, each adapted to receive a peg or block therein. Depending on the dimensions of a particular battery, pegs or blocks may be inserted into the appropriate receptacles and employed to retain the battery on the shelf. The bottom shelf 120 further has two rigid conductors, one of which is designated 160, longitudinally formed therein, which provide structural support to the bottom shelf 120.

The composite battery stand 100 further includes a switch 170 coupled to the two rigid conductors 160. The switch 170 may be an on/off switch that allows a particular battery string to be decoupled from the other batteries in the battery plant.

The composite battery stand 100 further includes a number of spacers (one of which is designated 130) stacked on top of the respective bottom shelves 120. Each spacer 130 is preferably designed to interlock with its respective bottom shelf 120 to form the battery storage compartments 110 wherein the batteries are housed. In the illustrated embodiment, the height of the spacer 130 is such that batteries having different heights may easily be accommodated. Providing a universal spacer 130 that accommodates many different heights of batteries may be economically advantageous. However, those skilled in the art should readily appreciate that the spacer 130, when needed, may be customized to fit batteries having nonstandard dimensions. Of course, a number of spacers 130 may be employed as necessary.

The composite battery stand 100 further includes a number of second shelves (one of which is designated 140) stacked on top of the respective spacers 130. In the illustrated embodiment, the second shelf 140 is similar to the bottom shelf 120. Of course, the second shelf 140 need not be similar to the bottom shelf 120. The second shelf 140 is interlocked with the spacer 130 and not only completes the battery storage compartment 110, but also provides a base upon which a second spacer 190 may be placed to form another battery storage compartment 110.

As illustrated in FIG. 1, an intershelf conductor 180 may be placed between the rigid conductors 160 of the different shelves 120, 140. The intershelf conductor 180 allows the batteries housed in the different battery storage compartments 110 to be coupled together, either in series or in parallel. The intershelf conductor 180 further allows for the option to have one main switch 170 control the entire composite battery stand 100.

Figure 2:
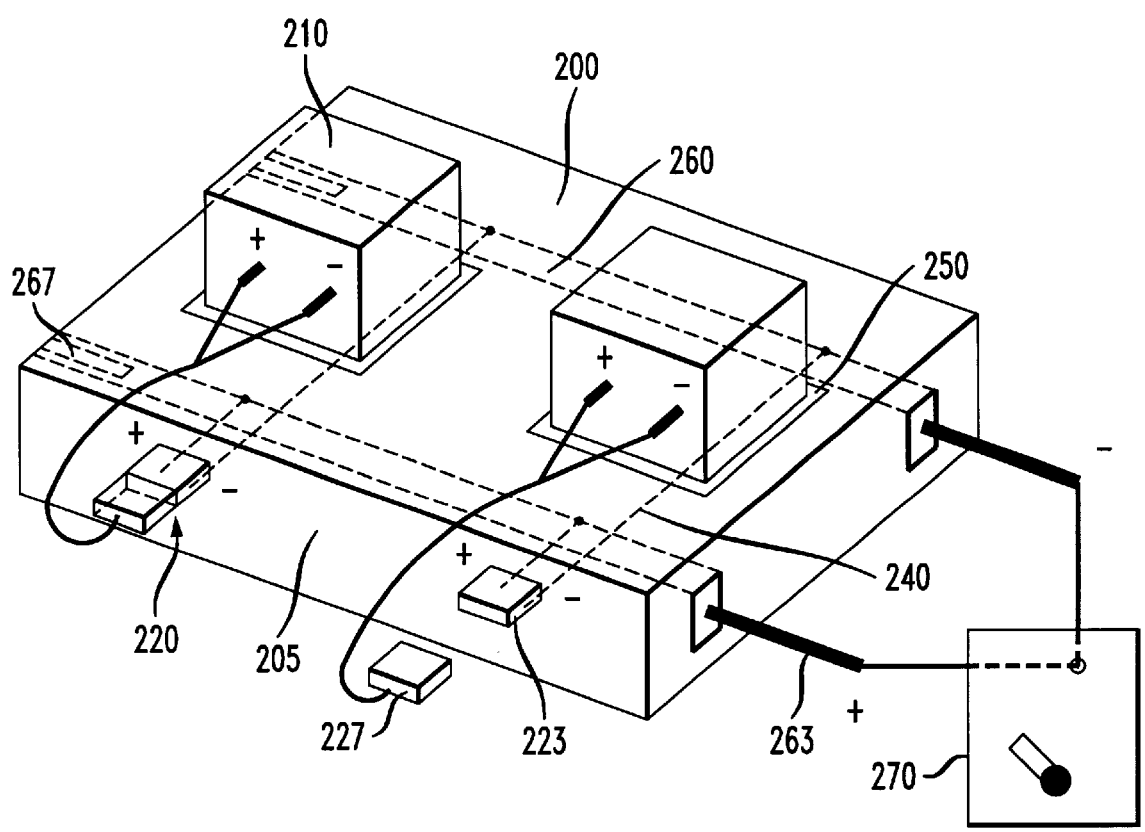
FIG. 2 illustrates an isometric view of an embodiment of a shelf constructed in accordance with the principles of the present invention.

Turning now to FIG. 2, illustrated is an isometric view of an embodiment of a shelf 200 constructed in accordance with the principles of the present invention. The shelf 200 includes two rigid conductors 260 longitudinally formed within. The rigid conductors 260 provide structural support to the shelf 200 and also provide electrical conductivity. This allows for multiple batteries (one of which is designated 210) to be connected to the rigid conductors 260 such that the batteries 210 may be coupled together in series or in parallel.

A side portion 205 of the shelf 200 has a number of connectors (one of which is designated 223) coupled thereto. The connectors 223 function as one half of a snap together plug 220. The connectors 223 are coupled to the rigid conductors 260, perhaps via conductive wires (one of which is designated 240). Of course, other ways of coupling the connectors 223 to the rigid conductors 260 are well within the broad scope of the present invention.

A mating connector 227, coupled to the battery 210, acts as the other half of the snap together plug 220. The connector 223 is adapted to receive the mating connector 227. The snap together plug 220 makes connecting and disconnecting the batteries 210 quick and easy and alleviates many of the problems associated with the prior art battery stand. Of course, the shelf 200 may contain as many connectors 223 as necessary to accommodate the batteries 210.

In the illustrated embodiment, the rigid conductors 260 have extended portions 263 that extend past the edge of the shelf 200. The extended portion 263 provides a number of advantages. The extended portion 263 may allow for multiple battery strings to be coupled together to form a larger battery string. In such an instance, the extended portion 263 of the rigid conductor 260 may plug into a receiving portion 267 of another rigid conductor. The shelf 200 of one battery storage compartment may be plugged into the shelf of another battery storage compartment thus linking a number of battery storage compartments together. The extended portion 263 may also provide a location for a switch 270 to be coupled to the rigid conductors 260. The switch 270 provides electrical access to the multiple batteries 210 connected in parallel or in series within the battery storage compartments.

In the illustrated embodiment, the shelf 200 has a number of recessed sections 250 therein adapted to receive and hold the batteries 210 in a desired location. The shelf 200 may have a square recessed section 250 to allow it to receive a square battery 210. Those skilled in the pertinent art realize that the recessed sections can have other shapes and be within the broad scope of the present invention. Of course, other methods of securing the batteries 210 in the battery stand are well within the broad scope of the present invention.

Although the present invention has been described in detail, those skilled in the art should understand that they can make various changes, substitutions and alterations herein without departing from the spirit and scope of the invention in its broadest form.

What is claimed is:

1. For use with a composite battery stand having a shelf adapted to receive at least one battery, an electrical distribution system, comprising:
    a rigid conductor, longitudinally formed in said shelf, that provides structural support to said shelf; and
    a connector coupled to said rigid conductor and adapted to receive a mating connector of a battery thereby providing electrical connectivity thereto.

2. The system as recited in claim 1 comprising a plurality of connectors coupled to said rigid conductor and adapted to receive a corresponding plurality of mating connectors of a respective plurality of batteries, said rigid conductor electrically connecting said plurality of batteries to form a battery string.

3. The system as recited in claim 1 further comprising a switch coupled to said rigid conductor.

4. The system as recited in claim 1 wherein said shelf comprises a flame retardant composite material.

5. The system as recited in claim 1 wherein said shelf comprises a corrosion resistant composite material.

6. The system as recited in claim 1 wherein said shelf comprises a recessed section therein to receive said battery.

7. The system as recited in claim 1 wherein said rigid conductor comprises copper.

8. The system as recited in claim 1 wherein said shelf is a bottom shelf of said battery stand, said bottom shelf further comprising an interlock for receiving a spacer that couples a second shelf to said bottom shelf.

9. The system as recited in claim 8 further comprising an intershelf conductor coupled between said bottom and second shelves.

10. A composite battery stand, comprising:
    a first shelf adapted to receive a first battery;
    a spacer stackable on and interlocking with said first shelf;
    a second shelf, stackable on and interlocking with said spacer, adapted to receive a second battery; and
    an electrical distribution system, including:
        first and second rigid conductors, longitudinally formed in said first and second shelves, respectively, that provide structural support to said first and second shelves, and
        first and second connectors coupled to said first and second rigid conductors, respectively, said first and second connectors adapted to receive corresponding first and second mating connectors of said first and second batteries thereby providing electrical connectivity thereto.

11. The battery stand as recited in claim 10 wherein said electrical distribution system further comprises an intershelf conductor coupled between said first and second rigid conductors.

12. The battery stand as recited in claim 10 wherein said electrical distribution system further comprises a switch coupled to at least one of said first and second rigid conductors.

13. The battery stand as recited in claim 10 wherein said first and second shelves comprise a flame retardant composite material.

14. The battery stand as recited in claim 10 wherein said first and second shelves comprise a corrosion resistant composite material.

15. The battery stand as recited in claim 10 wherein each of said first and second shelves comprise a recessed section therein to receive a respective one of said first and second batteries.

16. The battery stand as recited in claim 10 wherein at least one of said first and second rigid conductors comprises copper.

17. The battery stand as recited in claim 10 wherein at least one of said first and second batteries is selected from the group consisting of:
    a valve regulated lead acid battery, and
    a gel type electrolyte battery.

18. A method of manufacturing a composite battery stand, comprising:
    forming a first shelf adapted to receive a first battery;
    forming a spacer stackable on and interlocking with said first shelf;
    forming a second shelf, stackable on and interlocking with said spacer, adapted to receive a second battery; and
    providing an electrical distribution system, including:
        first and second rigid conductors, longitudinally formed in said first and second shelves, respectively, that provide structural support to said first and second shelves, and
        first and second connectors coupled to said first and second rigid conductors, respectively, said first and second connectors adapted to receive corresponding first and second mating connectors of said first and second batteries thereby providing electrical connectivity thereto.

19. The method as recited in claim 18 further comprising electrically coupled said first and second rigid conductors.

20. The method as recited in claim 18 wherein said electrical distribution system further comprises a switch coupled to at least one of said first and second rigid conductors.

21. The method as recited in claim 18 wherein said first and second shelves comprise a flame retardant composite material.

22. The method as recited in claim 18 wherein said first and second shelves comprise a corrosion resistant composite material.

23. The method as recited in claim 18 further comprising forming a recessed section in each of said first and second shelves adapted to receive a respective one of said first and second batteries.

24. The method as recited in claim 18 wherein at least one of said first and second rigid conductors comprises copper.

25. The method as recited in claim 18 wherein at least one of said first and second batteries is selected from the group consisting of:
    a valve regulated lead acid battery, and
    a gel type electrolyte battery.

* * * * *